United States Patent [19]
Yamamoto et al.

[11] Patent Number: 5,844,059
[45] Date of Patent: *Dec. 1, 1998

[54] PROCESS FOR PREPARING POLYACETAL COPOLYMER

[75] Inventors: Kaoru Yamamoto; Hiroyuki Kanai, both of Shizuoka, Japan

[73] Assignee: Polyplastics Co., Ltd., Japan

[ * ] Notice: The term of this patent shall not extend beyond the expiration date of Pat. No. 5,726,276.

[21] Appl. No.: 791,469

[22] Filed: Jan. 27, 1997

[51] Int. Cl.$^6$ .............................. C08G 6/00; C08G 2/00
[52] U.S. Cl. ..................... 528/230; 528/234; 528/239; 528/243; 528/245; 525/154; 525/398; 525/403; 525/405; 525/406; 525/427
[58] Field of Search ..................................... 528/230, 234, 528/239, 243, 245; 525/154, 398, 403, 405, 406, 427

[56] References Cited

U.S. PATENT DOCUMENTS 4,931,535   6/1990   Yamamoto et al. ..................... 528/230
4,956,445   9/1990   Yamamoto et al. .

FOREIGN PATENT DOCUMENTS 58167608   10/1983   Japan .
2263813   10/1990   Japan .

Primary Examiner—Duc Truong
Attorney, Agent, or Firm—Nixon & Vanderhye P.C.

[57] ABSTRACT

To prepare a thermally very stable polyacetal copolymer containing a very small amount of unstable parts in a high yield according to a simple process wherein an isopolyacid or an acid salt thereof is used as the polymerization catalyst in the copolymerization of trioxane as the principal monomer with a comonomer copolymerizable therewith, and wherein deactivation of the catalyst can be effected simply without fail through contact with a basic gas after polymerization without the necessity for any washing step. In the preparation of a polyacetal copolymer by the copolymerization of trioxane as the principal monomer with a cyclic ether or cyclic formal having at least one carbon—carbon bond as a comonomer, the copolymerization is effected using an isopolyacid or an acid salt thereof as the polymerization catalyst, followed by contact with a basic gas as a deactivator to deactivate the catalyst, and subsequent heat-melting treatment of the resulting crude polymer intact without washing thereof.

10 Claims, No Drawings

PROCESS FOR PREPARING POLYACETAL COPOLYMER

BACKGROUND OF THE INVENTION

1. Field of the Invention

The present invention relates to a process for preparing a polyacetal copolymer, more specifically to a process for preparing a polyacetal copolymer which is excellent in quality such as heat stability by a simple step using an isopolyacid or an acidic salt thereof in the copolymerization of trioxane as the principal monomer with a comonomer copolymerizable therewith.

2. Description of the Related Art

Cation copolymerization of trioxane as the principal monomer with a cyclic ether or cyclic formal having two or more carbon atoms adjacent to each other as a comonomer has so far been known as a process for preparing a polyacetal copolymer. Cationic catalysts proposed for use in this copolymerization include Lewis acids, particularly halides of boron, tin, titanium, phosphorus, arsenic and antimony, for example, boron trifluoride, tin tetrachloride, titanium tetrachloride, phosphorus pentachloride, phosphorus pentafluoride, arsenic pentafluoride and antimony pentafluoride, and complex compounds or salts thereof, protonic acids, for example, perchloric acid, esters of protonic acids, particularly esters of perchloric acid with aliphatic lower alcohols, for example, tertiary butyl perchlorate, anhydrides of protonic acids, particularly mixed anhydrides of perchloric acid and aliphatic lower carboxylic acids, for example, acetyl perchlorate, or trimethyloxonium hexafluorophosphate, triphenyl-methyl hexafluoroarzenate, acetyl tetrafluoroborate, acetyl hexafluorophosphate, and acetyl hexafluoroarzenate.

Among them, boron trifluoride or a coordinate compound of boron trifluoride with an organic compound, for example, ethers, is the most typical as a copolymerization catalyst for trioxane as the principal monomer and industrially widely used.

Conventional polymerization catalysts such as a boron trifluoride compound are required in relatively large amounts (for example, 40 ppm or more based on the whole monomers), and therefore it is difficult to sufficiently effect a deactivation treatment after the polymerization. Even though the deactivation treatment is accomplished, the residual matters originating in the catalyst accelerate decomposition to restrict the polymerization yield and the polymerization degree. Further, there is the problem that the presence of considerable amounts of the unstable parts requires a complicated stabilizing step.

That is, in the copolymerization of trioxane with conventional catalysts as described above, deactivation of the catalysts after the polymerization is important, and the insufficient deactivation thereof accelerates a decomposition of the resulting polymer and produces a primary cause to damage a subsequent stabilization of the resulting polymer. Accordingly, in the case where boron trifluoride is used as a catalyst, a very complicated process has so far been required, wherein in order to sufficiently effect a deactivation treatment of the catalyst, a large amount of a deactivator solution is added to a product obtained after the polymerization to effectuate the deactivation treatment, and the product is sufficiently washed to remove the residual monomers and a residue originating in the catalyst, followed by separating and drying the treating solution or recovering the monomers from the washing solution. Such a process is not preferred as well from an economical point of view.

Further, in order to remove complexity accompanied, many methods are proposed such as that a deactivation treatment of a catalyst in which the catalyst is deactivated by contacting a crude polymer with a gaseous deactivator (for example, JP-A-58-167608 and JP-A-2-263813). However, usually known catalysts such as a boron trifluoride type catalyst can not sufficiently be deactivated by such methods, and it is extremely difficult to obtain copolymers having a good heat stability. In particular, while an increase in a polymerization yield in the polymerization makes a resulting polymer is further instabilized, and a complicated stabilization treatment is required in a subsequent step. After all, the steps are not simplified. In addition, the resulting polymer has a limited stability and therefore is not preferred in terms of quality.

SUMMARY OF THE INVENTION

Summary of the Invention:

In view of such existing circumstances, an object of the present invention is to prepare a polyacetal copolymer having a very small amount of unstable parts even when the polymerization yield is raised up and being thermally very stable, by a simple process in which a catalyst can readily be deactivated by contacting with a basic gas and a washing step is unnecessary.

Intensive investigations respecting to kinds of catalysts and corresponding deactivating methods made by the present inventors in order to achieve the object described above have resulted in finding that the use of an isopolyacid or an acid salt thereof as a catalyst in particular makes it possible to deactivate the catalyst easily and surely by contacting with a basic gas while the catalyst characteristically has a high polymerization activity and that the object described above can be achieved, and thus completing the present invention.

That is, the present invention relates to a process for preparing a polyacetal copolymer by the copolymerization of trioxane as the principal monomer with a cyclic ether or a cyclic formal having at least one carbon-carbon bond as a comonomer, characterized in that the copolymerization is effected by using an isopolyacid or an acid salt thereof as a polymerization catalyst, followed by contacting the resulting polymer with a basic gas as a deactivator for the catalyst to deactivate the catalyst, and subsequently applying a heat-melting treatment to the crude polymer intact without washing it.

DETAILED DESCRIPTION OF THE INVENTION

The present invention is characterized in preparing a polyacetal copolymer which provides very small unstable parts even when the polymer is molten by heating as it is and which is thermally very stable particularly by using an isopolyacid or an acidic salt thereof as a polymerization catalyst which provides a very high polymerization activity and increases a polymerization yield in a very small amount of the catalyst and then can be deactivated by only contacting with a basic gas after the polymerization, so that residual matters originating in the catalyst does not entirely exert harmful effects and a washing step is not required. This is specifically effective while in the case of conventional boron trifluoride type catalysts, the deactivation thereof is insufficiently, in particular, when the deactivation is carried out by contacting with a gaseous deactivator, the catalyst tends to remain in the active state, further, it is difficult to avoid adverse effects such as decomposition caused by matters originating in the catalyst even after deactivation thereof.

DETAILED DESCRIPTION OF THE INVENTION

The present invention will be explained below in detail.

The isopolyacid is synonymous with isomultiple acid, homonuclear condensed acid, or homogeneous multiple acid and is a high molecular inorganic oxygen acid comprising a condensation product of an inorganic oxygen acid having a single kind of metal, which is derived from an isopolyacid salt represented by the following Formula (1) or (2):

$$mM^I_2O \cdot nM^V_2O_5 \cdot xH_2O \quad (1)$$

$$mM^I_2O \cdot nM^{VI}O_3 \cdot xH_2O \quad (2)$$

wherein $M^I$ represents principally an alkali metal; $M^V$ represents vanadium, niobium or tantalum belonging to the group V of the periodic table; $M^{VI}$ represents chromium, molybdenum, tungsten or uranium belonging to the group VI of the periodic table; m and n each represents an integer of at least 1; and x represents a number of 0 to 50.

The isopolyacid can be prepared by various methods such as a method in which a solution of the isopolyacid salt represented by Formula (1) or (2) described above, for example, isopolymolybdate, isopolytungstate or isopolyvanadate is treated with an ion exchange resin or a method in which a mineral acid is added to a concentrated solution of the isopolyacid salt and it is extracted with ether. Further, acid salts having a form in which protons of these acids are replaced partially with various metals can be used as well for the catalyst in the present invention.

Specific examples of these isopolyacids include, for example, isopolytungstic acid such as paratungstic acid and metatungstic acid; isopolymolybdic acid such as paramolybdic acid and metamolybdic acid; and isopolyvanadic acid. Among them, isopolytungstic acid is preferred.

An amount of the isopolyacid or the acid salt thereof used as the polymerization catalyst for the monomers comprising primarily trioxane depends on the kind thereof, and the polymerization can be controlled by suitably changing it. In general, the amount thereof falls in a range of 0.05 to 100 ppm, preferably 0.1 to 50 ppm based on the whole amount of the monomers to be polymerized. A used amount of preferably 0.1 to 10 ppm is sufficient for the isopolyacid having a very strong activity, such as paratungstic acid. Copolymerization capable of being effectuated even in so small an amount of the catalyst is effective for controlling to the least undesirable reactions such as principal chain decomposition of the polymer and depolymerization which are caused by the catalyst, and is economically advantageous.

In the present invention, it is preferred for homogeneously carrying out the reaction by adding to the monomers the preceding catalyst which is diluted with an inert solvent exerting no adverse effects on the polymerization. Ether compounds which are organic solvents capable of dissolving the isopolyacid or the acid salt thereof, for example, n-butyl ether, are preferred as the diluent. However, the diluent shall not be restricted thereto.

Trioxane which is a cyclic trimer of formaldehyde is used as the principal monomer in the present invention.

The comonomer used in the present invention is a cyclic ether or a cyclic formal having at least one adjacent carbon-carbon bond, and all of conventional comonomers used for copolymerization with trioxane can be used.

Typical examples of such cyclic ether or cyclic formal include, for example, 1,3-dioxolane, diethylene glycol formal, 1,4-butanediol formal, 1,3-dioxane, ethylene oxide, propylene oxide, and epychlorohydrin. Further, cyclic esters, for example, β-propiolactone, and vinyl compounds, for example, styrol can be used as well. Further, alkylenediglycidyl ether or diformal can also be used as a comonomer for allowing the copolymer to form a branched or cross-linked molecular structure. It includes, for example, butanediol dimethylideneglyceryl ether and butanediol diglycidyl ether. In particular, the preferred comonomers include cyclic ethers or cyclic formals such as 1,3-dioxolane, diethylene glycol formal, 1,4-butanediol formal, and ethylene oxide. An amount of the comonomer used in the present invention is 0.1 to 20 mole %, preferably 0.2 to 10 mole % based on trioxane. The amount of less than 0.1 mole % increases the unstable parts and deteriorates the stability. The excess amount softens the resulting polymer and lowers the melting point. Accordingly, both are not preferred.

In the polymerization process of the present invention, publicly known chain transfer agents, for example, low molecular weight linear acetals such as methylal can be added as well in order to control the polymerization degree according to purposes. The polymerization system is maintained preferably in the condition that impurities having active hydrogens, for example, water, methanol, formic acid or the like are not substantially present.

The polymerization of the present invention can be carried out by the same facilities and method as those used for a conventional copolymerization of trioxane. That is, either of a batch system and a continuous system can be employed, and a method in which liquid monomers are used to obtain a solid, powder or bulk polymer as the polymerization proceeds is generally applied.

With respect to polymerizing apparatuses used in the present invention, conventional reactors equipped with a stirrer can be used for a batch system, and continuous polymerizing apparatuses for trioxane which have so far been proposed, such as a cokneader, a two shaft screw type continuous extrusion blender, a two shaft paddle type continuous blender, and others that have been proposed so far can be used for a continuous system. Further, two or more kinds of polymerizing equipments can be used in combination.

The polymerization temperatures fall in a range of 60° to 120° C., particularly preferably 65° to 100° C.

In the present invention, it is preferred that the unreacted monomers remaining after the polymerization is lower, for example, 10% by weight or less, preferably 5% by weight or less, and more preferably 3% by weight or less. This is because the main object of the present invention is to carry out no washing for the polymerization product, and therefore an increased amount of the residual monomers is not preferred. In general, in order to reduce unreacted monomers, a polymerization rate can be raised to a fixed level or higher. In the case of the present invention, this can readily be achieved by suitably controlling an amount of the catalyst used and a polymerization time (a residence time in a continuous system). In particular, since the catalyst used in the present invention has a high activity, the polymerization can be completed for a relatively short time even with a small amount of the catalyst.

Further, a part of the residual monomers can be removed by evaporation to control the residual monomers to a given amount.

Next, after finishing the copolymerization, the crude polymer is contacted with a basic gas as a deactivator to deactivate the catalyst.

The basic gas used in the present invention can be added in an amount sufficient to neutralize and deactivate the catalyst, and usually is preferably a ten times or more as much molar amount as a catalyst amount used.

The basic gas used in the present invention includes ammonia or amine compounds. Preferred amine compounds are represented by the formula $R_1NH_2$, $R_1R_2NH$ or $R_1R_2R_3N$ (wherein, $R_1$, $R_2$ and $R_3$ each represents an alkyl group or alcohol group having 4 or below of carbon atoms).

The present invention is characterized in contacting the deactivator with the resulting polymer in a gaseous form, and therefore compounds having a relatively low molecular weight and a low boiling point are preferred for the amine compounds described above. $R_1$, $R_2$ and $R_3$ have particularly preferably a carbon number of 2 or less. As will be described later, amines having a relatively high boiling point can be contacted with the polymer in a gaseous form by diluting the amines with a carrier gas.

Examples of the amine compound include methylamine, dimethylamine, trimethylamine, ethylamine diethylamine, triethylamine butylamine dibutylamine, tributylamine, and corresponding aldoholamines (for example, trimethanolamine). Among them, methylamine, dimethylamine, and trimethylamine are particularly preferred.

The basic gases described above may be used alone or in the form of mixed gases prepared by diluting with other carrier gases to be contacted with the resulting polymer. The carrier gas is not specifically limited and is preferably an inner gas. It may be, for example, a nitrogen gas and other organic gases.

A method for contacting the basic gas with the crude polymer is not specifically limited as long as it is a method in which the basic gas described above can sufficiently be contacted with particles of the resulting copolymer. Any of a method in which a crude polymer is well stirred and mixed under the basic gas atmosphere; a method in which a basic gas is blown in countercurrently against a crude copolymer; and a method in which a basic gas is passed through the particles in the crude polymer layer while circulating the basic gas can be applied.

In a deactivation treatment of the catalyst, the crude polymer is preferably fine powder. For this purpose, a polymerization reactor has preferably a function to sufficiently pulverize a bulk polymer, or the reaction product may be pulverized separately by means of a crusher after the polymerization, and then the basic gas may be contacted therewith. Further, pulverization and stirring may be carried out at the same time in the presence of the basic gas.

With respect to a grain size of the crude polymer in the deactivation treatment, 90% or more of the crude polymer has a grain size of 3 mm or less, preferably 2 mm or less, and more preferably 1 mm or less.

The deactivation treatment temperature is in the range from 0° to 140° C., preferably 20° to 120° C.

In the present invention, the crude polymer which has been contacted with the basic gas for the deactivation treatment for the catalyst is then subjected to a heat-melting treatment as it is, i.e., without washing.

The heat-melting treatment is carried out preferably in the presence of a stabilizer. The stabilizer may be added and blended at an optional period of after the polymerization and before the heat-melting treatment or during the heat-melting treatment. In the preferred embodiment, the heat-melting treatment is carried out while adding a small amount (for example, 0.1 to 5% by weight) of water.

It is important to add as stabilizers, substances publicly known as stabilizers for conventional polyacetal resins, for example, various hindered phenol type antioxidants.

Further, various nitrogen-containing compounds, metal oxides and fatty acid salts may be added and used in combination.

The hindered phenol type antioxidants include, for example, 2,6-di-t-butyl-4-methylphenol, triethylene glycol-bis [3-(3-t-butyl-5-methyl-4-hydroxyphenyl)propionate], 1,6-hexanediol-bis-[3-(3,5-di-t-butyl-4-hydroxyphenyl) propionate], tetrakis [3-(3,5-di-t-butyl-4-hydroxyphenyl) propionate]methane, N,N'-hexamethylenebis(3,5-di-t-butyl-4-hydroxyhydrocynnamide), 2-t-butyl-6-(3'-t-butyl-5'-methyl-2'-hydroxybenzyl)-4-methylphenylacrylate, and 3,9-bis[2-{(3-t-butyl-4-hydroxy-5-methylphenyl) propionyloxy}-1,1'-dimethylethyl]-2,4,8,10-tetraoxaspiro [5,5]-undecane.

The nitrogen-containing compounds include dicyanediamide, melamine or derivatives thereof, urea or derivatives thereof, benzotriazole compounds, piperidine compounds (hindered amines), and various polyamides or copolymers thereof (for example, nylons 6, 12, 6/12, 6/66/ 610, and 6/66/610/12).

Oxides of alkaline earth metals are preferred as the metal oxides, and the fatty acid metal salts include calcium salts or magnesium salts of higher fatty acids.

The heat-melting treatment in the present invention is carried out preferably at temperatures falling in a range of a melting point of the resulting polymer or higher and up to 250° C., particularly preferably the melting point or higher and up to 230° C. The temperatures higher than 250° C. are not preferred since the polymer is decomposed or deteriorated. A heat treating apparatus shall not specifically be restricted. The apparatuses having a function to knead a molten polymer and a vent function are required and include, for example, single shaft or multi-shaft continuous extrusion-kneaders having at least one vent hole and cokneaders.

In the present invention, the polymerization catalyst is further completely deactivated in this melt-kneading treatment, and the blended basic gas as a deactivator or its adsorption column accelerates decomposition and elimination of the unstable parts of the crude polymer and is removed from the vent part together with other volatile substances, whereby pellets of the stable polyacetal copolymer can be obtained. In order to meet this purpose, it is a matter of course to preferably reduce pressure in the vent hole for aspiration.

EXAMPLES

The examples of the present invention shall be shown below but it is a matter of course that the present invention shall not be restricted thereto. The terms and the measuring methods used in the examples and the comparative examples are shown below.

% or ppm: shown by weight.

Residual monomer: shown by % of the residual monomers based on the whole fed monomers.

Melt index (MI): shows a melt index (g/10 min) measured at 190° C.; this was evaluated as a characteristic value corresponding to a molecular weight; that is, the lower the Mi is, the higher the molecular weight is.

Alkali decomposition rate (an amount of unstable parts present): pellets of the copolymer are pulverized, and 1 g thereof is put in 100 ml of a 50% methanol aqueous solution containing 0.5% of ammonium hydroxide to heat it at 180° C. for 45 minutes in a sealed vessel; then, an amount of formaldehyde decomposed and eluted into the solution is quantitatively analyzed and shown by % based on the polymer.

Heating weight loss rate: shown by a weight loss rate observed when 5 g of the copolymer pellets is heated at 230° C. for 45 minutes in the air. Examples 1 to 13 and Comparative Examples 1 to 2

A continuous mixing reactor which had a cross-section formed by superposing partially two circles and in which a barrel equipped with a jacket for passing a heat transfer medium (cooling medium) on the outside and two rotational shafts equipped with a lot of paddles for agitating and propelling were disposed inside at the longitudinal direction was used, wherein while passing warm water of 70° C. through the jacket and rotating the two rotational shafts at a fixed rate, trioxane containing 3.5% of a comonomer shown in Table 1 and 700 ppm of methylal as a chain transfer agent was continuously fed to a place thereof; an isopolyacid catalyst (a solution prepared by dissolving it in di-n-butyl ether) shown in Table 1 was added to the same place at the same time in an amount shown in Table 1 based on the whole monomer to carry out the copolymerization.

Then, after the reaction product discharged from a discharge port of this polymerization apparatus was continued to be further polymerized in a different apparatus (a part of the polymer was sampled to determine a residual monomer amount), and the polymer was passed through a crusher to be pulverized (the pulverized polymer of 90% or more had a grain size of 2 mm or less), and then the pulverized polymer was contacted with the basic bas specified in Table 1 at 80° C. for 30 minutes. Then, 0.5% of tetrakis-[methylene-3-(3,5-di-t-butyl-4-hydroxyphenyl)propionate] methane as a stabilizer and 0.2% of melamine were added to agitate and mix them for 5 minutes in a Honschel mixer. Then, the polymer was molten and kneaded at a temperature of 210° C. at a vacuum degree of 5 mm Hg at the vent part by means of a two shaft extruding machine equipped with a vent and extruded to prepare pellets. The pellets were dried and then measured for an MI, a heat decomposition rate, and a heating weight loss rate. The results thereof are shown in Table 1.

For the sake of comparison, the copolymers using boron trifluoride butyl ethelate as the catalyst were prepared in the same manner (Table 2).

TABLE 1

| | Polymerization catalyst | | | |
| --- | --- | --- | --- | --- |
| Example | Kind | Amount (PPM based on whole monomer) | Comonomer | Residual monomer amount after polymerization (% based on whole monomer) |
| 1 | Paratungstic acid | 4 | 1,3-Dioxolane | 2.0 |
| 2 | " | 4 | " | 2.0 |
| 3 | " | 4 | " | 2.0 |
| 4 | " | 4 | " | 2.0 |
| 5 | " | 4 | " | 2.0 |
| 6 | " | 4 | " | 2.0 |
| 7 | " | 4 | " | 2.0 |
| 8 | " | 4 | " | 2.0 |
| 9 | " | 2 | " | 5.5 |
| 10 | Metatungstic acid | 6 | " | 3.0 |
| 11 | Paramolybdic acid | 8 | " | 3.0 |
| 12 | Paratungstic acid | 4 | 1,4-Butanediol formal | 2.8 |
| 13 | " | 4 | Diethylene glycol formal | 3.6 |

| | Basic gas | | Properties of extruded pellet | | |
| --- | --- | --- | --- | --- | --- |
| Example | Kind | Added amount (% based on crude polymer) | MI (g/10 min) | Alkali decomposition rate (%) | Heating weight loss rate (%) |
| 1 | Ammonia | 0.1 | 7.8 | 0.53 | 0.34 |
| 2 | Ammonia (carrier gas: N$_2$) | 0.05 | 8.2 | 0.56 | 0.40 |
| 3 | Ammonia | 1.5 | 7.4 | 0.49 | 0.29 |
| 4 | Methylamine | 0.5 | 8.0 | 0.65 | 0.38 |
| 5 | Dimethylamine | 0.5 | 8.3 | 0.68 | 0.47 |
| 6 | Trimethylamine | 0.5 | 8.8 | 0.69 | 0.41 |
| 7 | Ethylamine | 0.5 | 8.5 | 0.71 | 0.48 |
| 8 | Triethylamine (carrier gas: N$_2$) | 0.5 | 9.1 | 0.72 | 0.58 |
| 9 | Ammonia | 0.1 | 7.6 | 0.55 | 0.35 |
| 10 | " | 0.1 | 7.8 | 0.59 | 0.44 |
| 11 | " | 0.1 | 9.3 | 0.75 | 0.58 |
| 12 | " | 0.1 | 7.5 | 0.50 | 0.35 |
| 13 | " | 0.1 | 7.9 | 0.57 | 0.37 |

TABLE 2

| Comparative Example | Polymerization catalyst | | Comonomer | Residual monomer amount after polymerization (% based on whole monomer) |
|---|---|---|---|---|
| | Kind | Amount (PPM based on whole monomer) | | |
| 1 | Borontrifluoride butyl ethelate | 40 (as $BF_3$) | 1,3-Dioxolane | 2.5 |
| 2 | Borontrifluoride butyl ethelate | 40 (as $BF_3$) | " | 2.5 |

| Comparative Example | Basic gas | | Properties of extruded pellet | | |
|---|---|---|---|---|---|
| | Kind | Added amount (% based on crude polymer) | MI (g/10 min) | Alkali decomposition rate (%) | Heating weight loss rate (%) |
| 1 | Ammonia | 0.1 | 18.2 | 1.73 | 0.75 |
| 2 | Trimethylamine | 0.5 | 16.2 | 1.54 | 0.71 |

As apparent from the explanations and the examples described above, the production process of the present invention is a process which is simplified very much as compared with conventional processes since a washing step is eliminated, wherein the catalyst can completely be deactivated; there are no troubles such as decomposition and degeneration attributable to the catalyst; the stable polyacetal copolymer having less unstable parts can be obtained; and the polyacetal copolymer having an excellent quality can be prepared economically.

What is claimed is:

1. A process for preparing a polyacetal copolymer comprising:

(a) copolymerizing a reaction mixture, which includes trioxane as a principal monomer with a cyclic ether or cyclic formal having at least one carbon—carbon bond as a comonomer, in the presence of an isopolyacid or an acid salt thereof as a polymerization catalyst, (b) continuing the copolymerization reaction according to step (a) until the remaining unreacted monomers account for 10 wt. % or less of all monomers fed into the reaction mixture to thereby obtain a reaction product mixture comprised of crude copolymer product and unreacted monomers, and thereafter (c) treating the resulting reaction product mixture by contacting the crude copolymer product with a gaseous basic catalyst deactivator to deactivate the catalyst, and then subsequently without washing the crude copolymer product, (d) forming a melt of the crude copolymer product.

2. The process as claimed in claim 1, wherein the polymerization catalyst is an isopolyacid or an acid salt thereof derived from an isopolyacid salt represented by formula (1) or (2):

  (1)

  (2)

wherein $M^I$ represents principally an alkali metal; $M^V$ represents vanadium, niobium or tantalum belonging to the group V of the periodic table; $M^{VI}$ represents chromium, molybdenum, tungsten or uranium belonging to the group VI of the periodic table; m and n each represents an integer of at least 1; and x represents a number of 0 to 50.

3. The process as claimed in claim 1, wherein the isopolyacid or the acid salt thereof is paratungstic acid, metatungustic acid, paramolybdic acid, metamolybdic acid, or an acid salt thereof.

4. The process as claimed in claim 1, wherein the comonomer is at least one member selected from the group consisting of 1,3-dioxolane, diethylene glycol formal, 1,4-butanediol formal, and ethylene oxide.

5. The process as claimed in claim 1, wherein the gaseous basic catalyst deactivator is ammonia.

6. The process as claimed in claim 1, wherein the gaseous basic catalyst deactivator is an amine compound.

7. The process as claimed in claim 6, wherein the amine compound is a compound represented by the formula:

wherein $R_1$, $R_2$ and $R_3$ each represents an alkyl or alcohol group having 4 or lower carbon atoms.

8. The process as claimed in claim 1, wherein the gaseous basic cataltst deactivator is used either as it is or in the form of a mixture thereof diluted with a carrier gas to effect to contact therewith the resulting copolymer to deactivate the catalyst.

9. The process as claimed in claim 1, wherein prior to step (c) there is practiced the step of pulverizing the crude copolymer product to obtain particles such that at least 90% of the particles thereof have a particle size of at most 3 mm.

10. The process as claimed in claim 1, wherein step (d) includes forming a melt of the crude copolymer product in the presence of a stabilizer.

* * * * *